(12) United States Patent
Mueller

(10) Patent No.: US 10,532,635 B2
(45) Date of Patent: Jan. 14, 2020

(54) ATTACHABLE SUN VISOR SYSTEM

(71) Applicant: Cecil W. Mueller, Amarillo, TX (US)

(72) Inventor: Cecil W. Mueller, Amarillo, TX (US)

( * ) Notice: Subject to any disclaimer, the term of this patent is extended or adjusted under 35 U.S.C. 154(b) by 78 days.

(21) Appl. No.: 16/002,814

(22) Filed: Jun. 7, 2018

(65) Prior Publication Data

US 2019/0023107 A1    Jan. 24, 2019

Related U.S. Application Data

(60) Provisional application No. 62/536,443, filed on Jul. 24, 2017.

(51) Int. Cl.
*B60J 3/00*        (2006.01)
*B60J 3/02*        (2006.01)

(52) U.S. Cl.
CPC ........... *B60J 3/0208* (2013.01); *B60J 3/0256* (2013.01)

(58) Field of Classification Search
CPC .............................. B60J 3/0208; B60J 3/0256
See application file for complete search history.

(56) References Cited

U.S. PATENT DOCUMENTS

| | | | |
|---|---|---|---|
| 5,417,466 A * | 5/1995 | Giantonio | B60J 3/0208 296/97.6 |
| 6,189,947 B1 * | 2/2001 | Annan | B60J 3/0208 296/97.11 |
| 7,731,265 B1 * | 6/2010 | Cohen | B60J 3/0208 296/97.6 |
| 8,226,149 B2 | 7/2012 | Brule | |
| 8,708,395 B1 | 4/2014 | Kim | |
| 2006/0113819 A1 * | 6/2006 | Remy | B60J 3/0278 296/97.11 |
| 2007/0080556 A1 | 4/2007 | Milano | |

* cited by examiner

*Primary Examiner* — Lori L Lyjak
(74) *Attorney, Agent, or Firm* — Charles Runyan

(57) ABSTRACT

An attachable sun visor system includes a sun visor extension assembly including a sun shade panel, an extendable rod having a first-end, a second-end, and a mounting member. The sun shade panel is configured to attach to a rod of a stationary sun visor in a vehicle and swivel from being adjacent to the stationary sun visor during non-use to being perpendicular to the stationary sun visor during an in-use condition to provide an effective shade area in combination with the stationary sun visor.

18 Claims, 5 Drawing Sheets

ATTACHABLE SUN VISOR SYSTEM

CROSS REFERENCE TO RELATED APPLICATION

The present application is related to and claims priority to U.S. Provisional Patent Application No. 62/536,443 filed Jul. 24, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of vehicle accessories and more specifically relates to sun visors.

2. Description of Related Art

While driving, people often have to deal with sun glare during the day and headlight glare from other vehicles at night. Vehicles are equipped with visors above the driver and passenger seats to help prevent and eliminate glare from the front of the vehicle. Some of the visors can swing outward to the side and protect the driver from sun glare through the side window but having to constantly switch the visor's position while driving can be frustrating. It also does not allow the driver to obtain sun protection from the front and the side simultaneously. A suitable solution is desired.

U.S. Pat. No. 8,708,395 to Sun Y. Kim relates to an attachment flap for vehicle sun visors. The described attachment flap for vehicle sun visors includes an auxiliary sun flap for a conventional vehicle sun visor that has a shade panel configured to fold within the perimeter of a conventional vehicle sun visor where the visor has an edge and the shade panel is connected to the edge of the visor and the shad panel has a hinge connected to one end of the shade panel and a connector that connects to the sun visor edge such that the shade panel folds against the conventional vehicle sun visor during periods of non-use and folds outward to extend the effective shade area of the vehicle sun visor.

BRIEF SUMMARY OF THE INVENTION

In view of the foregoing disadvantages inherent in the known vehicle accessory art, the present disclosure provides a novel attachable sun visor system. The general purpose of the present disclosure, which will be described subsequently in greater detail, is to provide an attachable sun visor able to swivel to allow the visor to pop out, and extend, allowing for two areas to be covered by the visor at once.

An attachable sun visor system is disclosed herein. The attachable sun visor system includes a sun visor extension assembly including a sun shade panel, an extendable rod having a first-end, a second-end, and a mounting member. The mounting member is positioned at the first-end of the extendable rod and is configured to provide a biasing member for removeably attaching the sun visor extension assembly to a rod of a stationary sun visor in a vehicle. The extendable rod is configured to allow the sun shade panel to extend and retract in relation to the mounting member. The mounting member includes a semi flexible snap-on fastener. The snap-on fastener includes a channel for inserting the rod of the stationary sun visor in the vehicle. The sun shade panel is configured to swivel from being adjacent to the stationary sun visor during non-use to being perpendicular to the stationary sun visor during an in-use condition to provide an effective shade area in combination with the stationary sun visor.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an attachable sun visor system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to vehicle accessories and more particularly to an attachable sun visor system as used to improve the coverage and shading provided by a visor.

Generally, attachable sun visor system is designed to block the sun from the side of a vehicle while the front visor of a vehicle simultaneously blocks sunlight from the windshield area. The present invention is comprised of a snap on sun visor with a swivel connection that connects to the pre-existing sun visor rod in a vehicle. The snap on device has a counter weight side. The opposite side has a telescopic rod that allows the visor to extend the entire length of the door window. The present invention provides drivers with an additional sun glare visor that covers the side window of a vehicle. This prevents sun and headlight glare from entering the vehicle from the side. It attaches directly to the existing front visor and extends sideways to block the side window. It works in conjunction with the front visor to fully block sunlight from entering the driver's line of vision. The present invention eliminates sun glare during the daylight hours while offering protection from other motorists' headlights at night.

Figure 1:
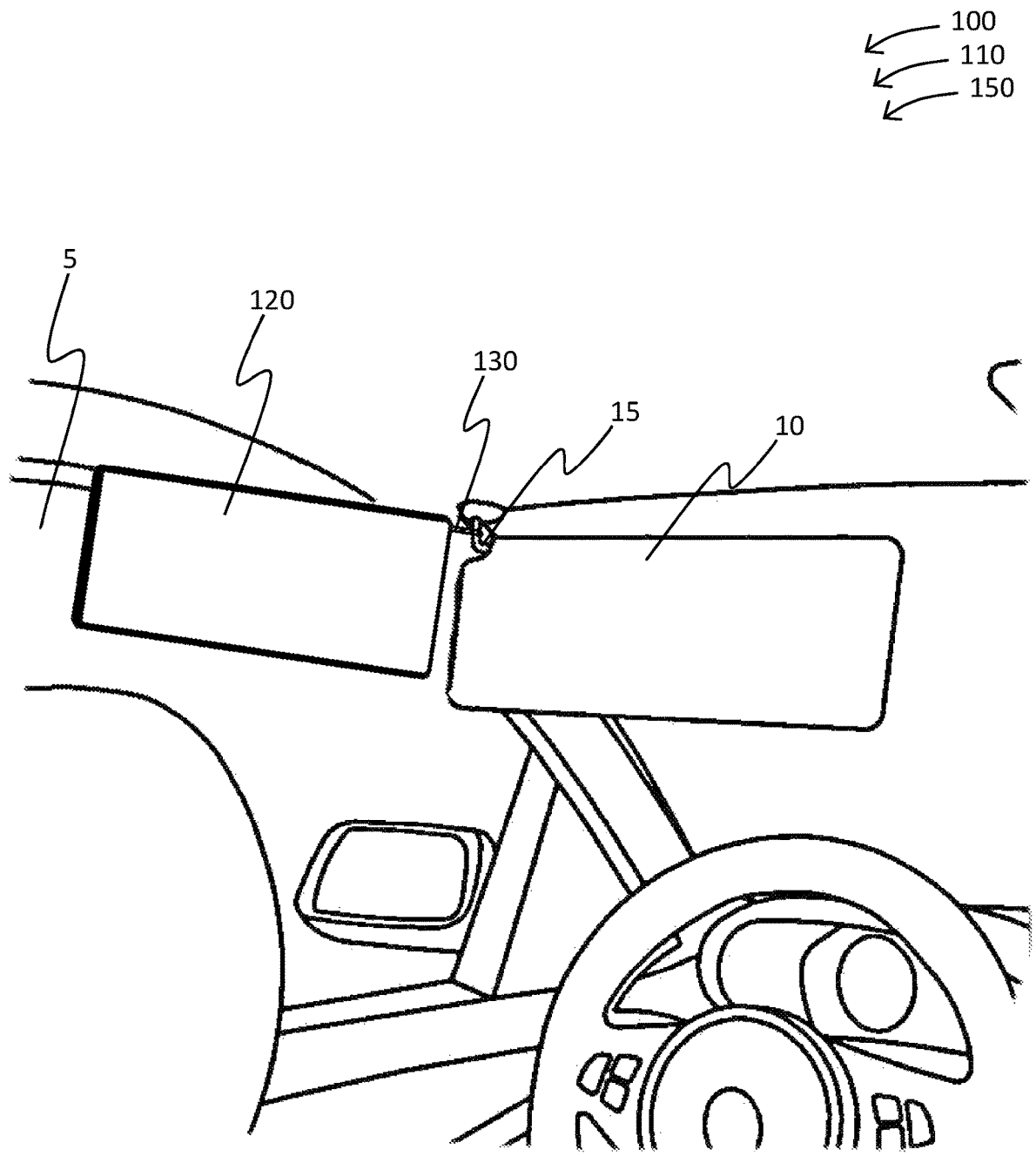
FIG. 1 is a perspective view of the attachable sun visor system during an 'in-use' condition, according to an embodiment of the disclosure.

Referring now more specifically to the drawings by numerals of reference, there is shown in FIGS. 1-5, various views of an attachable sun visor system 100. FIG. 1 shows an attachable sun visor system 100 during an 'in-use' condition 150, according to an embodiment of the present disclosure. As illustrated, the attachable sun visor system 100 may include a sun visor extension assembly 110 having a sun shade panel 120, an extendable rod 130 having a first-end 132, a second-end 136, and a mounting member 140. The present invention provides drivers with an additional sun shade panel 120 that covers a side window 5 of a vehicle.

Figure 2:
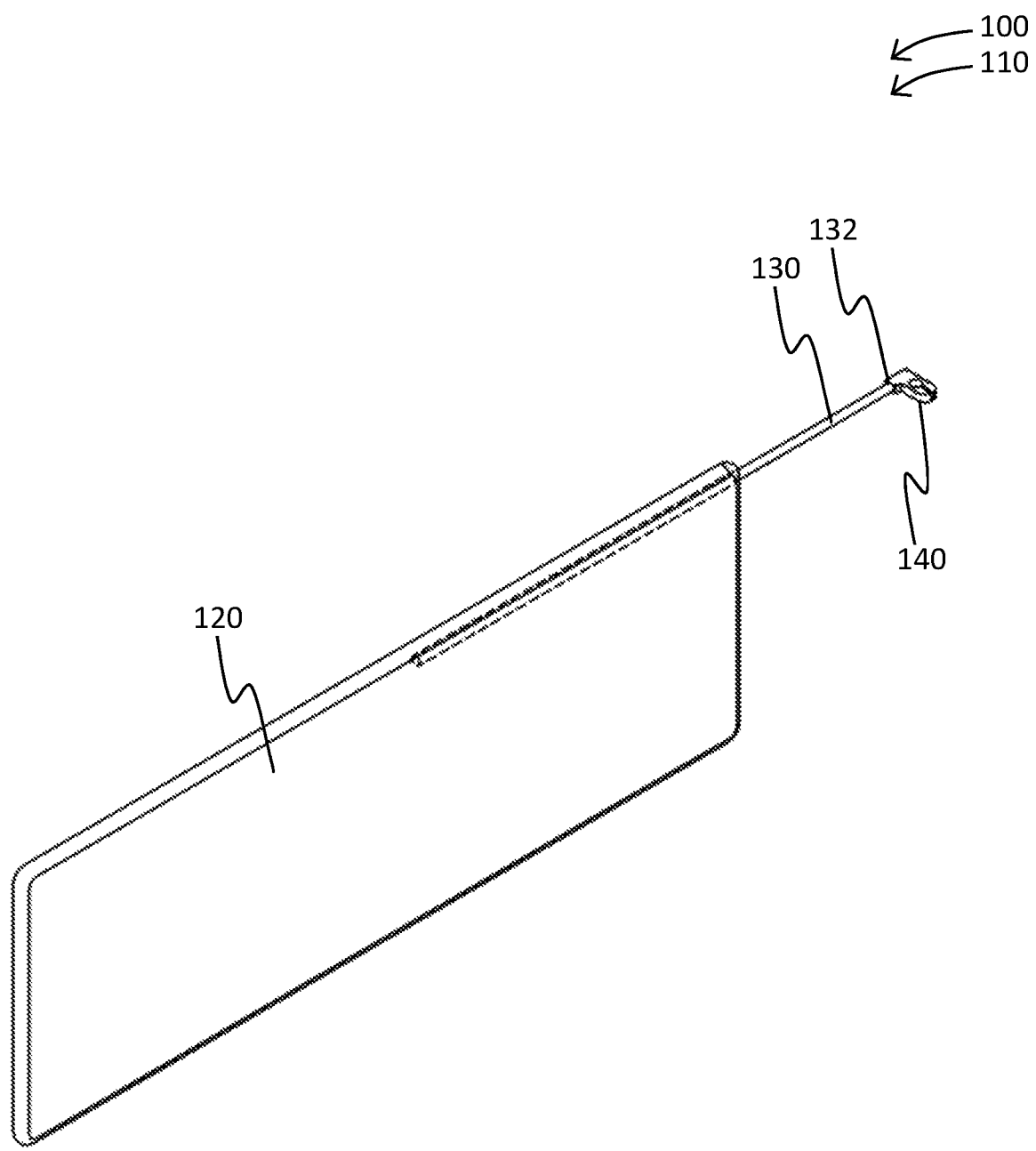
FIG. 2 is a perspective view of the attachable sun visor system of FIG. 1, according to an embodiment of the present disclosure.

FIG. 2 shows a perspective view of the attachable sun visor system 100 of FIG. 1, according to an embodiment of the present disclosure. As above, the attachable sun visor system 100 may include the sun visor extension assembly 110 including the sun shade panel 120, the extendable rod 130 having the first-end 132, the second-end 136, and the mounting member 140. The extendable rod 130 is configured to allow the sun shade panel 120 to extend and retract in relation to the mounting member 140. The mounting member 140 is positioned at the first-end 132 of the extendable rod 130 and is configured to provide a biasing member for removeably attaching the sun visor extension assembly 110 to a rod 15 of a stationary sun visor 10 in a vehicle.

Figure 3:
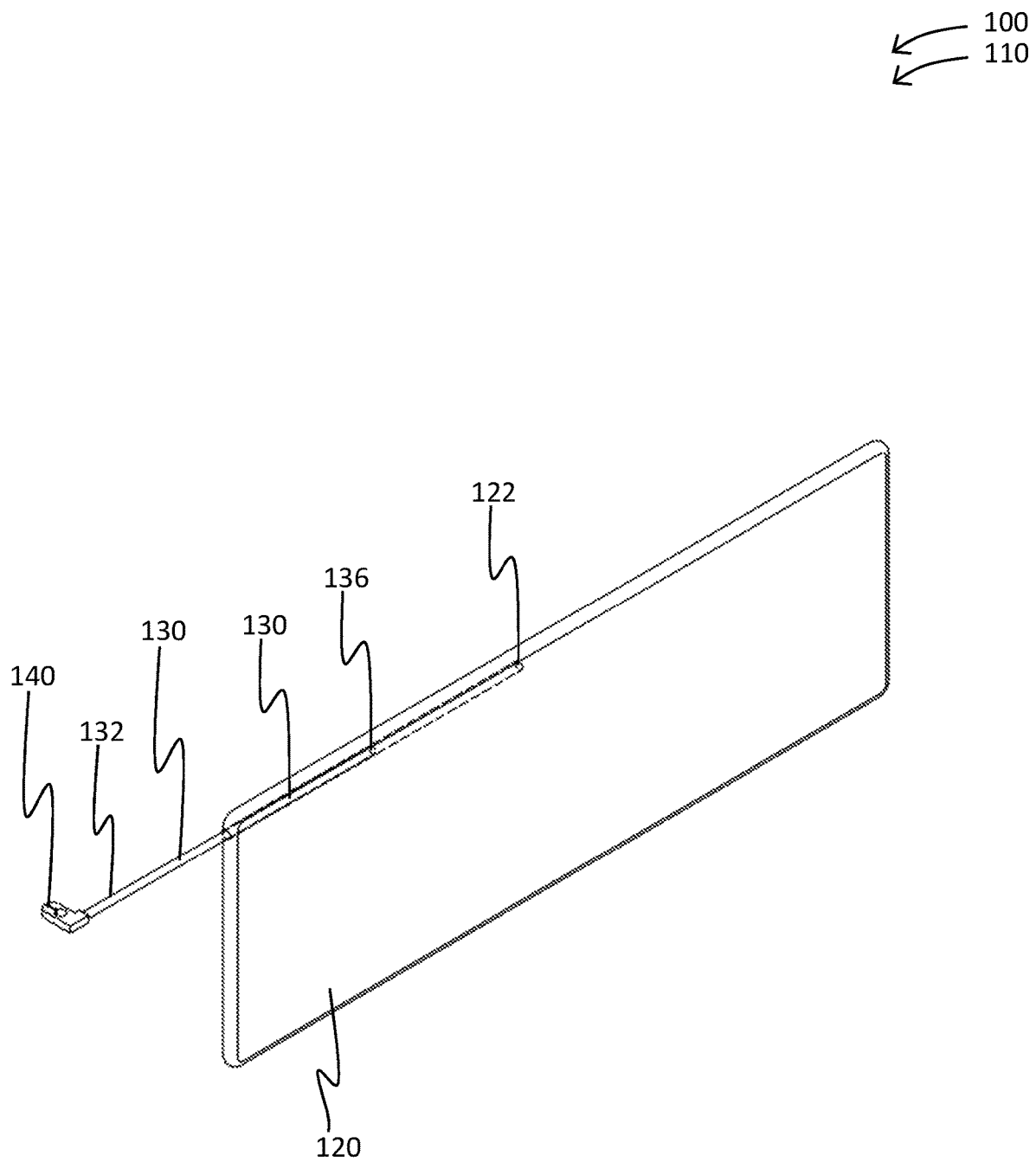
FIG. 3 is a perspective view of the attachable sun visor system of FIG. 1, according to an embodiment of the present disclosure.

Referring now to FIG. 3 showing a perspective view of the attachable sun visor system 100 of FIG. 1, according to an embodiment of the present disclosure. As above, the attachable sun visor system 100 may include the sun visor extension assembly 110. The sun shade panel 120 is configured to swivel from being adjacent to the stationary sun visor 10 during non-use to being perpendicular to the stationary sun visor 10 during an in-use condition to provide an effective shade area in combination with the stationary sun visor 10. The sun shade panel 120 is positioned perpendicularly at approximately 90 degrees from the stationary sun visor 10 during the in-use condition. The sun shade panel 120 is folded against the stationary sun visor 10 during the non-use.

Figure 4:
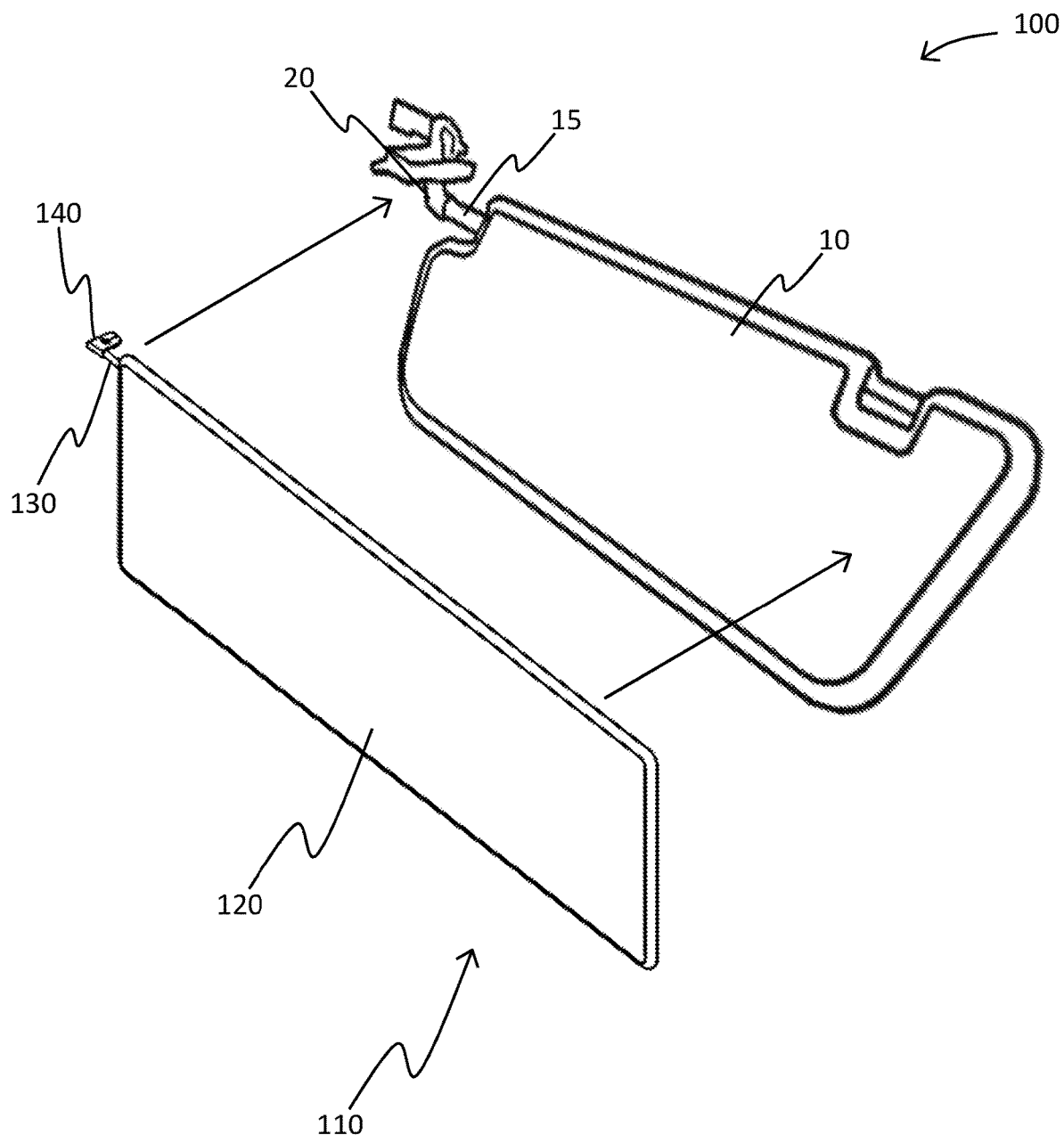
FIG. 4 is a perspective view of the attachable sun visor system of FIG. 1, according to an embodiment of the present disclosure.

FIG. 4 shows a perspective view of the attachable sun visor system 100 of FIG. 1, according to an embodiment of the present disclosure. As above, the attachable sun visor system 100 may include the sun visor extension assembly 110 having the sun shade panel 120, the extendable rod 130 having the first-end 132, the second-end 136, and the mounting member 140. The extendable rod 130 is positioned on a top edge of the sun shade panel 120. The sun shade panel 120 further comprises a rod-channel 122, the extendable rod 130 configured within. The extendable rod 130 is telescopic and configured to extend the sun shade panel 120 along a length of a side window 5 of the vehicle. The sun visor extension assembly 110 comprises a counter weight opposing the extendable rod 130. In a preferred embodiment, the sun shade panel 120 is planar and comprises a substantially rectangular profile and a similar length and width as the stationary sun visor 10.

Figure 5:
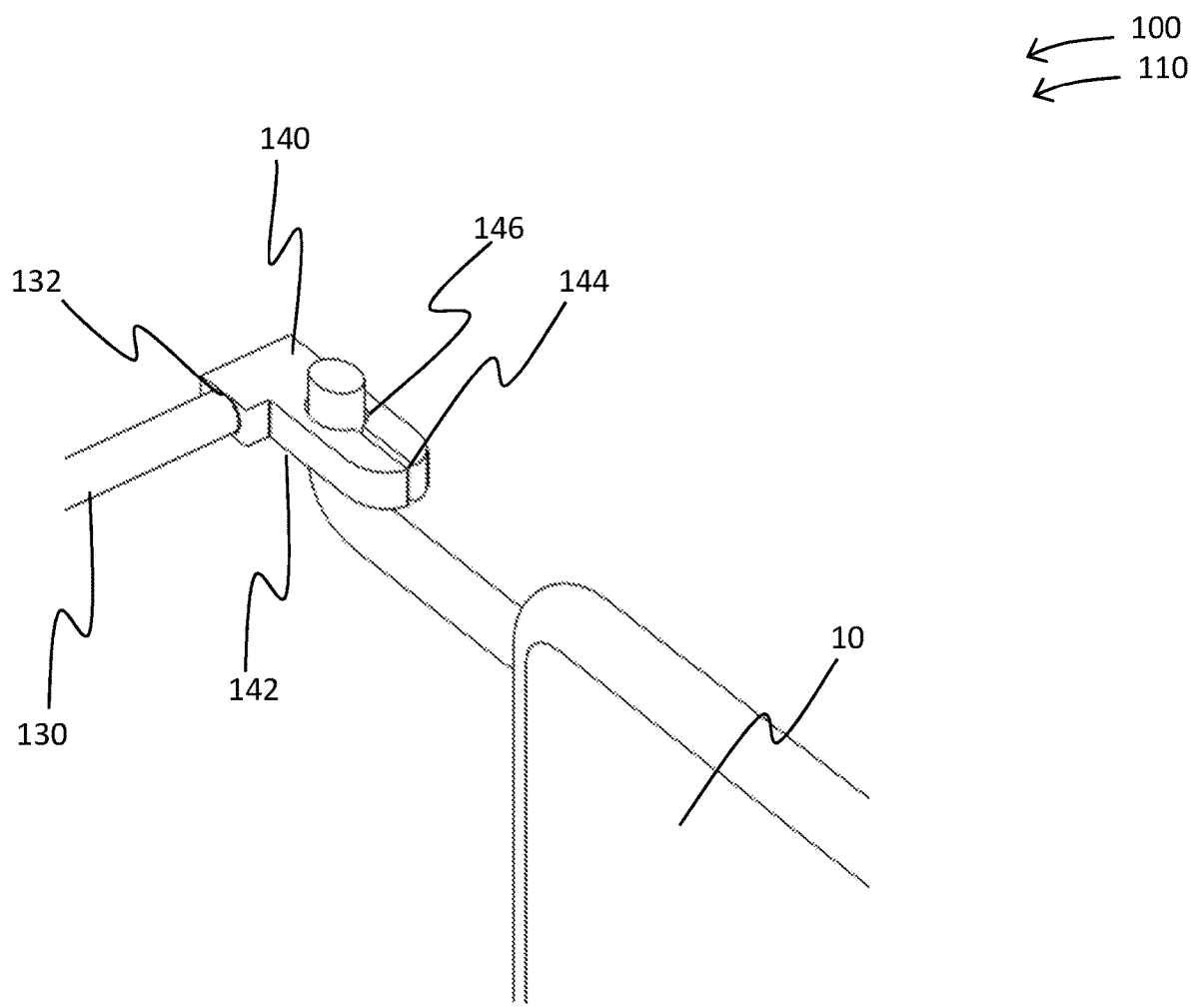
FIG. 5 is a perspective view of the attachable sun visor system of FIG. 1, according to an embodiment of the present disclosure.

Referring now to FIG. 5 showing a perspective view of the attachable sun visor system 100 of FIG. 1, according to an embodiment of the present disclosure. As above, the attachable sun visor system 100 may include the sun shade panel 120, the extendable rod 130 having the first-end 132, the second-end 136, and the mounting member 140. The mounting member 140 includes a semi flexible snap-on fastener 142. The snap-on fastener 142 includes a channel 144 for inserting the rod 15 of the stationary sun visor 10 in the vehicle. The mounting member 140 clips to a first-portion 20 of the rod 15 of the stationary sun visor 10. The channel 144 extends to a circular member 146 which is configured to contour to the rod 15 of the stationary sun visor 10 when fully inserted. The circular member 146 comprises a diameter substantially similar to the first-portion 20 of the rod 15. The circular member 146 is configured to rotate about the rod 15 allowing a user to manipulate the sun shade panel 120 between positions. The sun visor extension assembly 110 is removably couplable to the rod 15.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An attachable sun visor system comprising:
   a sun visor extension assembly including;
      a sun shade panel;
      an extendable rod having;
         a first-end;
         a second-end; and
         a mounting member;
   wherein said extendable rod is configured to allow said sun shade panel to extend and retract in relation to said mounting member;
   wherein said mounting member is positioned at said first-end of said extendable rod and is configured to provide a biasing member for removeably attaching said sun visor extension assembly to a rod of a stationary sun visor in a vehicle; and
   wherein said sun shade panel is configured to swivel from being adjacent to said stationary sun visor during non-use to being perpendicular to said stationary sun visor during an in-use condition to provide an effective shade area in combination with said stationary sun visor.

2. The attachable sun visor system of claim 1, wherein said mounting member includes a semi flexible snap-on fastener.

3. The attachable sun visor system of claim 2, wherein said snap-on fastener includes a channel for inserting said rod of said stationary sun visor in said vehicle.

4. The attachable sun visor system of claim 3, wherein said channel extends to a circular member which is configured to contour to said rod of said stationary sun visor when fully inserted.

5. The attachable sun visor system of claim 4, wherein said circular member is configured to rotate about said rod allowing a user to manipulate said sun shade panel between positions.

6. The attachable sun visor system of claim 1, wherein said sun visor extension assembly is removably couplable to said rod.

7. The attachable sun visor system of claim 1, wherein said sun shade panel is positioned perpendicularly at approximately 90 degrees from said stationary sun visor during said in-use condition.

8. The attachable sun visor system of claim 7, wherein said sun shade panel is folded against said stationary sun visor during said non-use.

9. The attachable sun visor system of claim 1, wherein said extendable rod is positioned on a top edge of said sun shade panel.

10. The attachable sun visor system of claim 9, wherein said sun shade panel further comprises a rod-channel, said extendable rod configured within.

11. The attachable sun visor system of claim 10, wherein said extendable rod is telescopic and configured to extend said sun shade panel along a length of a side window of said vehicle.

12. The attachable sun visor system of claim 11, wherein said sun visor extension assembly comprises a counter weight opposing said extendable rod.

13. The attachable sun visor system of claim 1, wherein said sun shade panel comprises a substantially similar length and width as said stationary sun visor.

14. The attachable sun visor system of claim 13, wherein said sun shade panel is planar.

15. The attachable sun visor system of claim 14, wherein said sun shade panel comprises a substantially rectangular profile.

16. The attachable sun visor system of claim 4, wherein said mounting member clips to a first-portion of said rod of said stationary sun visor.

17. The attachable sun visor system of claim 16, wherein said circular member comprises a diameter substantially similar to said first-portion of said rod.

18. An attachable sun visor system, the attachable sun visor system comprising:
- a sun visor extension assembly including;
  - a sun shade panel;
  - an extendable rod having;
    - a first-end;
    - a second-end; and
    - a mounting member;
- wherein said extendable rod is configured to allow said sun shade panel to extend and retract in relation to said mounting member;
- wherein said mounting member is positioned at said first-end of said extendable rod and is configured to provide a biasing member for removeably attaching said sun visor extension assembly to a rod of a stationary sun visor in a vehicle;
- wherein said mounting member includes a semi flexible snap-on fastener;
- wherein said snap-on fastener includes a channel for inserting said rod of said stationary sun visor in said vehicle;
- wherein said mounting member clips to a first-portion of said rod of said stationary sun visor;
- wherein said channel extends to a circular member which is configured to contour to said rod of said stationary sun visor when fully inserted;
- wherein said circular member is configured to rotate about said rod allowing a user to manipulate said sun shade panel between positions;
- wherein said circular member comprises a diameter substantially similar to said first-portion of said rod;
- wherein said sun visor extension assembly is removably couplable to said rod;
- wherein said extendable rod is positioned on a top edge of said sun shade panel;
- wherein said sun shade panel further comprises a rod-channel, said extendable rod configured within;
- wherein said extendable rod is telescopic and configured to extend said sun shade panel along a length of a side window of said vehicle;
- wherein said sun visor extension assembly comprises a counter weight opposing said extendable rod;
- wherein said sun shade panel is configured to swivel from being adjacent to said stationary sun visor during non-use to being perpendicular to said stationary sun visor during an in-use condition to provide an effective shade area in combination with said stationary sun visor;
- wherein said sun shade panel is positioned perpendicularly at approximately 90 degrees from said stationary sun visor during said in-use condition;
- wherein said sun shade panel is folded against said stationary sun visor during said non-use;
- wherein said sun shade panel comprises a substantially similar length and width as said stationary sun visor;
- wherein said sun shade panel is planar; and
- wherein said sun shade panel comprises a substantially rectangular profile.

* * * * *